(12) United States Patent
Liew et al.

(10) Patent No.: US 12,418,024 B2
(45) Date of Patent: Sep. 16, 2025

(54) LITHIUM METAL BATTERY WITH DENDRITE-SUPPRESSING COATING AND PRODUCTION METHOD FOR SAME

(71) Applicant: Nano and Advanced Materials Institute Limited, Hong Kong (HK)

(72) Inventors: Soon Yee Liew, Hong Kong (HK); Yu Tat Tse, Hong Kong (HK); Ou Dong, Hong Kong (HK); Sing Ho Lo, Hong Kong (HK); Shengbo Lu, Hong Kong (HK); Li Fu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 621 days.

(21) Appl. No.: 17/853,909

(22) Filed: Jun. 29, 2022

(65) Prior Publication Data

US 2023/0022046 A1     Jan. 26, 2023

Related U.S. Application Data

(60) Provisional application No. 63/223,558, filed on Jul. 20, 2021.

(51) Int. Cl.
*H01M 4/38*     (2006.01)
*H01M 4/04*     (2006.01)
(Continued)

(52) U.S. Cl.
CPC ......... *H01M 4/382* (2013.01); *H01M 4/0404* (2013.01); *H01M 4/134* (2013.01);
(Continued)

(58) Field of Classification Search
CPC ............... H01M 4/382; H01M 10/052; H01M 10/0568; H01M 10/0569; H01M 4/134;
(Continued)

(56) References Cited

FOREIGN PATENT DOCUMENTS

| CN | 106784629 A | 5/2017 |
|---|---|---|
| CN | 108376764 A | 8/2018 |
| WO | WO 01/39303 | * 5/2001 |

OTHER PUBLICATIONS

Liu et al., "Lithiophilic Ag/Li Composite Anodes via a Spontaneous Reaction for Li Nucleation with Reduced Barrier", Journal of Materials Chemistry A, Royal Society of Chemistry, 2019.
(Continued)

*Primary Examiner* — Laura Weiner
(74) *Attorney, Agent, or Firm* — IDEA Intellectual Limited; Sam T. Yip

(57) ABSTRACT

The present invention provides a lithium metal battery having a lithium metal electrode including a cathode, an anode, a separator positioned between the cathode and the anode, an electrolyte, and a lithium metal negative electrode. The lithium metal negative electrode includes a lithium reactive metal layer, the lithium reactive metal layer being formed on a support conductive layer. A dendrite-suppressing coating is formed over the lithium reactive metal layer; the dendrite-suppressing coating is a displacement-reacted metal including silver reacted from decomposition of a silver salt and having an interface reaction product formed from a reaction between the silver salt and the lithium reactive metal layer. The interface reaction product is positioned between the displacement-reacted metal layer and the lithium reactive metal layer. The dendrite suppressing coating permits lithium metal ions to permeate the coating to react electrolytically in an overall battery reaction.

14 Claims, 6 Drawing Sheets

(51) Int. Cl.
*H01M 4/134* (2010.01)
*H01M 4/1395* (2010.01)
*H01M 4/36* (2006.01)
*H01M 4/525* (2010.01)
*H01M 4/58* (2010.01)
*H01M 4/66* (2006.01)
*H01M 10/052* (2010.01)
*H01M 10/0568* (2010.01)
*H01M 10/0569* (2010.01)
*H01M 4/02* (2006.01)

(52) U.S. Cl.
CPC ......... *H01M 4/1395* (2013.01); *H01M 4/366* (2013.01); *H01M 4/525* (2013.01); *H01M 4/5825* (2013.01); *H01M 4/661* (2013.01); *H01M 10/052* (2013.01); *H01M 10/0568* (2013.01); *H01M 10/0569* (2013.01); *H01M 2004/027* (2013.01)

(58) Field of Classification Search
CPC .... H01M 4/661; H01M 4/525; H01M 4/5825; H01M 4/366; H01M 2004/027; H01M 4/0404; H01M 4/1395
See application file for complete search history.

(56) References Cited

OTHER PUBLICATIONS

Zuo et al., "Lithiophilic Silver Coating on Lithium Metal Surface for Inhibiting Lithium Dendrites", Frontiers in Chemistry, vol. 8, Article 109, Feb. 2020.

International Search Report and Written Opinion of corresponding PCT Patent Application No. PCT/CN2022/106661 mailed on Oct. 26, 2022.

* cited by examiner

LITHIUM METAL BATTERY WITH DENDRITE-SUPPRESSING COATING AND PRODUCTION METHOD FOR SAME

FIELD OF THE INVENTION

The present invention relates to a lithium metal battery, and more particularly, to a lithium metal battery with a dendrite-suppressing coating. The invention is further related to the method for preparing a thin layer of a dendrite-suppressing coating on a lithium metal battery anode.

BACKGROUND OF THE INVENTION

In recent years, with the rapid development of science and technology, industries such as aerospace, new energy vehicles, high-speed rail, and large-scale energy storage grids have also ushered in a period of rapid development, and the requirements for energy storage equipment are also increasing. High energy density lithium metal batteries can meet people's requirements for energy storage devices with high energy density and high-power density. Lithium (Li) metal batteries have also become a research focus in recent years.

Rechargeable lithium metal batteries (LMBs) are actively being developed as a next generation electric storage technology due to the extremely high theoretical specific capacity (3860 mAh $g^{-1}$), low weight (0.534 g $cm^{-3}$), and the lowest electrochemical potential (−3.040 V versus SHE) of Li metal.

However, their poor cyclability and potential safety have hindered the commercial development of these batteries due to the Li dendritic formation and its reaction with the electrolyte during battery cycles. For repeated charge and discharge cycles, lithium "dendrites" gradually grow out from the lithium metal electrode, pass through the electrolyte, and ultimately contact the positive electrode. This causes an internal short circuit in the battery, rendering the battery unusable after a relatively few cycles. While cycling, lithium electrodes may also grow "mossy" deposits which can dislodge from the negative electrode and thereby reduce the battery's capacity. The dendrite growth may pierce the membrane to cause an internal short circuiting and then triggering thermal runaway to cause serious safety risks. Therefore, it is a basic prerequisite to eliminate Li dendritic growth for development of a reversible and highly efficient Li metal anode of LMBs.

To address the shortcomings of the negative electrode of lithium metal batteries, some researchers have proposed coating the electrolyte-facing side of the lithium negative electrode with a "protective layer". Such a protective layer must conduct lithium ions, but at the same time prevent contact between the lithium electrode surface and the bulk electrolyte. Many techniques for applying protective layers have not succeeded.

The current "protective layer" materials have problems such as being difficult to scale-up preparation with a high degree of uniformity. As for the coating methods, thermal evaporation methods are expensive and difficult to scale up and therefore not practical for industrial development. For drop coating or spray coating methods applied to large areas, the solution from these coating methods will spread on the lithium surface, and drops can combine to form "pools", which subsequently result in the flooding of the lithium surface, and therefore making it impossible to achieve any controlled deposition on the lithium surface. In some academic literature, the coating of silver on lithium by the displacement reaction has only been shown for a relatively small lithium surface which is approximately smaller than 2 $cm^2$, such as the size of a typical coin cell battery (Zuo et al. 2020).

Therefore, there is a need in the art for the lithium metal battery with dendrite-suppressing coating that overcomes the aforementioned problems; the dendrite-suppressing coating should combine the characteristics of being able to apply the coating to a large area as well as chemical stability to materials and conditions on either side of the protective layer.

SUMMARY OF THE INVENTION

The present invention provides a lithium metal battery having a lithium metal electrode including a cathode, an anode, a separator positioned between the cathode and the anode, an electrolyte, and a lithium metal negative electrode.

In another aspect, the present invention provides a lithium metal battery having the lithium metal negative electrode including a lithium reactive metal layer, the lithium reactive metal layer being formed on a support conductive layer. A dendrite-suppressing coating is formed over the lithium reactive metal layer; the dendrite-suppressing coating is a displacement-reacted metal including silver reacted from decomposition of a silver salt and having an interface reaction product formed from a reaction between the silver salt and the lithium reactive metal layer. The interface reaction product is positioned between the displacement-reacted metal layer and the lithium reactive metal layer. The dendrite suppressing coating permits lithium metal ions to permeate the coating to react electrolytically in an overall battery reaction.

In another aspect, the present invention provides a lithium metal battery having the dendrite-suppressing coating is approximately 20 microns or less.

In another aspect, the present invention provides a lithium metal battery having the support conductive layer comprises copper.

In another aspect, the present invention provides a lithium battery having the electrolyte includes one or more active ingredients selected from $LiAlCl_4$, $LiClO_4$, $LiPF_6$, LiTFSI, and LiFSI.

In another aspect, the present invention provides a lithium metal battery having the electrolyte, further includes a solvent selected from one or more of 1M $LiAlCl_4$ in $SO_2Cl_2$ or $SOCl_2$, 1 M $LiClO_4$ in propylene carbonate, 1 M $LiPF_6$ in ethylene carbonate/ethyl methyl carbonate/diethyl carbonate/dimethyl carbonate/fluoroethylene carbonate/dimethoxyethane, 1-4M LiTFSI/LiFSI in dimethoxyethane/1,1,2,2-tetrafluoroethyl 2,2,3,3-tetrafluoropropyl ether (TTE)/tris(2,2,2-trifluoroethyl)orthoformate (TFEO).

In another aspect, the present invention provides a lithium metal battery having the electrolyte includes one or more additive of lithium difluoro(oxalate)borate (LiDFOB), lithium bis(oxalate)borate (LiBOB), lithium bis(trifluoromethanesulfonyl)imide (LiTFSI), lithium nitrate, hexafluorobenzene, ethyl-methyl-imidazolium nitrate, butyl-methyl-imidazolium nitrate, triethylphosphate, trimethylphosphate or combinations thereof.

In another aspect, the present invention provides a lithium metal battery having the cathode includes one or more of $LiCoO_2$, Li (Ni, Mn, Co)$O_2$, $LiFePO_4$, Li(Ni, Co, Al)$O_2$.

In another aspect, the present invention provides a lithium metal battery in which the silver salt is $AgNO_3$ and the interface reaction product is $LiNO_3$.

The present invention provides a method for preparing a thin layer of a dendrite-suppressing coating on a lithium metal battery anode including: 1) providing an impregnated displacement reaction masking layer, the impregnated displacement reaction masking layer including a solution having one or more silver salts and a solvent; 2) contacting a surface of a lithium metal battery anode material with the impregnated displacement reaction masking layer; 3) causing a displacement reaction between the one or more silver salts and the surface of the lithium metal battery anode material such that silver salt is reduced to metallic silver on the surface of lithium metal battery anode material, the metallic silver displacing a stoichiometric amount of lithium from the surface of lithium metal battery anode material; 4) removing the impregnated displacement reaction masking layer from the surface of the lithium metal battery anode material.

In another aspect, the present invention provides a method for preparing a thin layer of a dendrite-suppressing coating on a lithium metal battery anode, in which the dendrite-suppressing coating is approximately 20 μm or less.

In another aspect, the present invention provides a method for preparing a thin layer of a dendrite-suppressing coating on a lithium metal battery anode, in which the lithium metal battery anode material is a lithium metal foil or a laminated lithium-copper foil.

In another aspect, the present invention provides a method for preparing a thin layer of a dendrite-suppressing coating on a lithium metal battery anode, in which the lithium metal battery anode material has a coating area greater than approximately 30 cm$^2$.

In another aspect, the present invention provides a method for preparing a thin layer of a dendrite-suppressing coating on a lithium metal battery anode, in which the silver salt is one or more of silver nitrate, silver acetate, silver lactate, silver p-toluene sulfonate, silver heptafluorobutyrate, silver pentafluoropropionate, silver methanesulfonate, silver tetrafluoroborate, silver trifluoroacetate, silver bromide, silver hexafluorophosphate, silver iodide, silver bis(trifluoromethanesulfonyl)imide.

In another aspect, the present invention provides a method for preparing a thin layer of a dendrite-suppressing coating on a lithium metal battery anode, in which the solvent is one or more dimethoxyethane, dioxolane, N-methylpyrrolidone, dimethylcarbonate, dimethylacetamide, tetrahydrofuran, triethyl phosphate, trimethyl phosphate, or a combination thereof.

In another aspect, the present invention provides a method for preparing a thin layer of a dendrite-suppressing coating on a lithium metal battery anode, and the solution has a silver ion concentration of less than approximately 25 mM.

In another aspect, the present invention provides a method for preparing a thin layer of a dendrite-suppressing coating on a lithium metal battery anode, and the solution comprising dimethoxyethane/dioxolane/N-methylpyrrolidone in a ratio of 47.5/47.5/5.

In another aspect, the present invention provides a method for preparing a thin layer of a dendrite-suppressing coating on a lithium metal battery anode, further includes contacting a surface of a lithium metal battery anode material with the impregnated displacement reaction masking layer plural times and removing the impregnated displacement reaction masking layer in between contacting with the displacement reaction masking layer.

In another aspect, the present invention provides a method for preparing a thin layer of a dendrite-suppressing coating on a lithium metal battery anode, in which the duration of each contact with the impregnated displacement reaction masking layer is less than approximately 2 minutes.

In another aspect, the present invention provides a method for preparing a thin layer of a dendrite-suppressing coating on a lithium metal battery anode, further includes evaporating unreacted solution from the surface of the lithium metal battery anode material.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Below the preferred embodiments of the present invention are described; it should be appreciated that preferred embodiment described herein only is used for description and interpretation of the present invention, and not to be used as limiting the present invention.

Figure 1A:
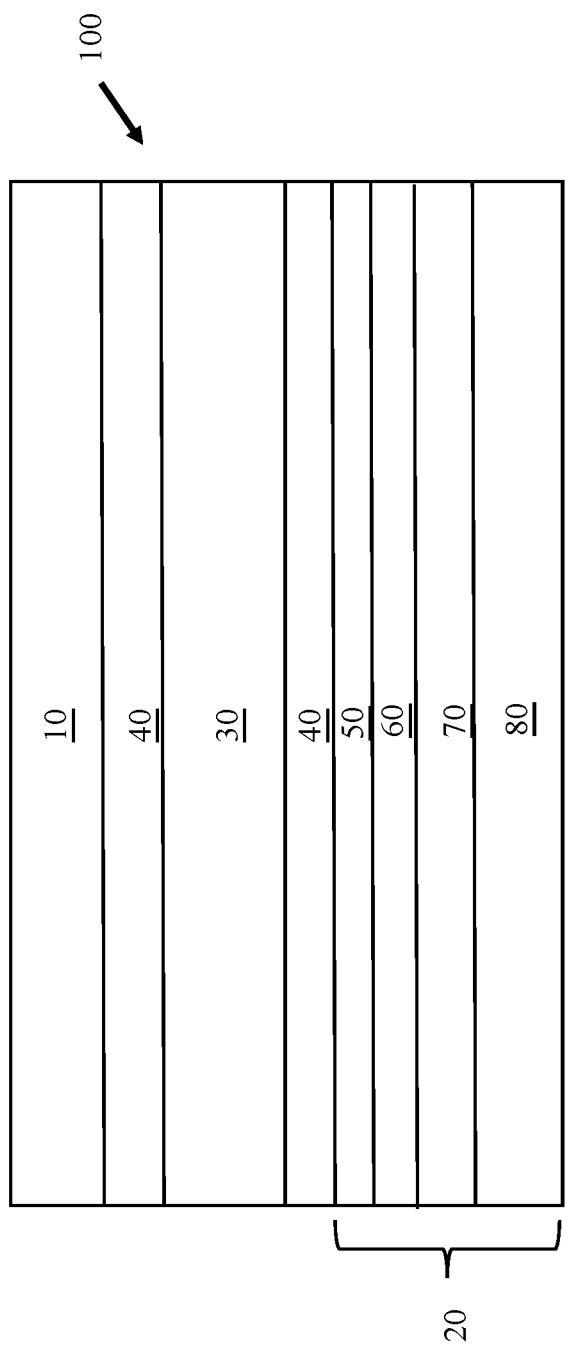
FIG. 1A schematically depicts the pattern of a lithium metal battery in present invention.

Turning to FIG. 1A, the present invention provides a lithium metal battery 100 having a cathode 10, an anode 20, a separator 30 positioned between the cathode and the anode, and an electrolyte 40. The anode includes a lithium layer 70 on an optional support layer 80. The cathode of the lithium metal battery includes one or more of $LiCoO_2$, Li(Ni, Mn, Co)$O_2$, $LiFePO_4$, Li(Ni, Co, Al)$O_2$. However, other lithium-containing cathode materials may be used. The electrolyte of the lithium metal battery may include one or more of 1M $LiAlCl_4$ in $SO_2Cl_2$ or $SOCl_2$, 1 M $LiClO_4$ in propylene carbonate, 1 M $LiPF_6$ in ethylene carbonate/ethyl methyl carbonate/diethyl carbonate/dimethyl carbonate/fluoroethylene carbonate/dimethoxyethane, 1-4M LiTFSI/LiFSI in dimethoxyethane/1,1,2,2-tetrafluoroethyl 2,2,3,3-tetrafluoropropyl ether (TTE)/tris(2,2,2-trifluoroethyl) orthoformate (TFEO); however, other electrolytes may also be used. Also, the electrolyte may include one or more optional additives such as lithium difluoro(oxalate)borate (LiDFOB), lithium bis(oxalate)borate (LiBOB), lithium bis(trifluoromethanesulfonyl)imide (LiTFSI), lithium nitrate, hexafluorobenzene, ethyl-methyl-imidazolium nitrate, butyl-methyl-imidazolium nitrate, triethylphosphate, trimethylphosphate or combinations thereof.

In the battery of FIG. 1A, a dendrite-suppressing layer 50 is formed over the lithium layer 70. In one embodiment, the dendrite suppressing layer 50 is a metal layer deposited from a metal salt in a displacement reaction with the underlying lithium layer 70. During the displacement reaction, an interlayer is formed that is a reaction product between the salt portion of the metal salt and lithium. For example, if the metal is selected to be silver and the metal salt is selected to be silver nitrate, the interlayer 60 that is formed in lithium nitrate (LiNO₃).

Figure 2:
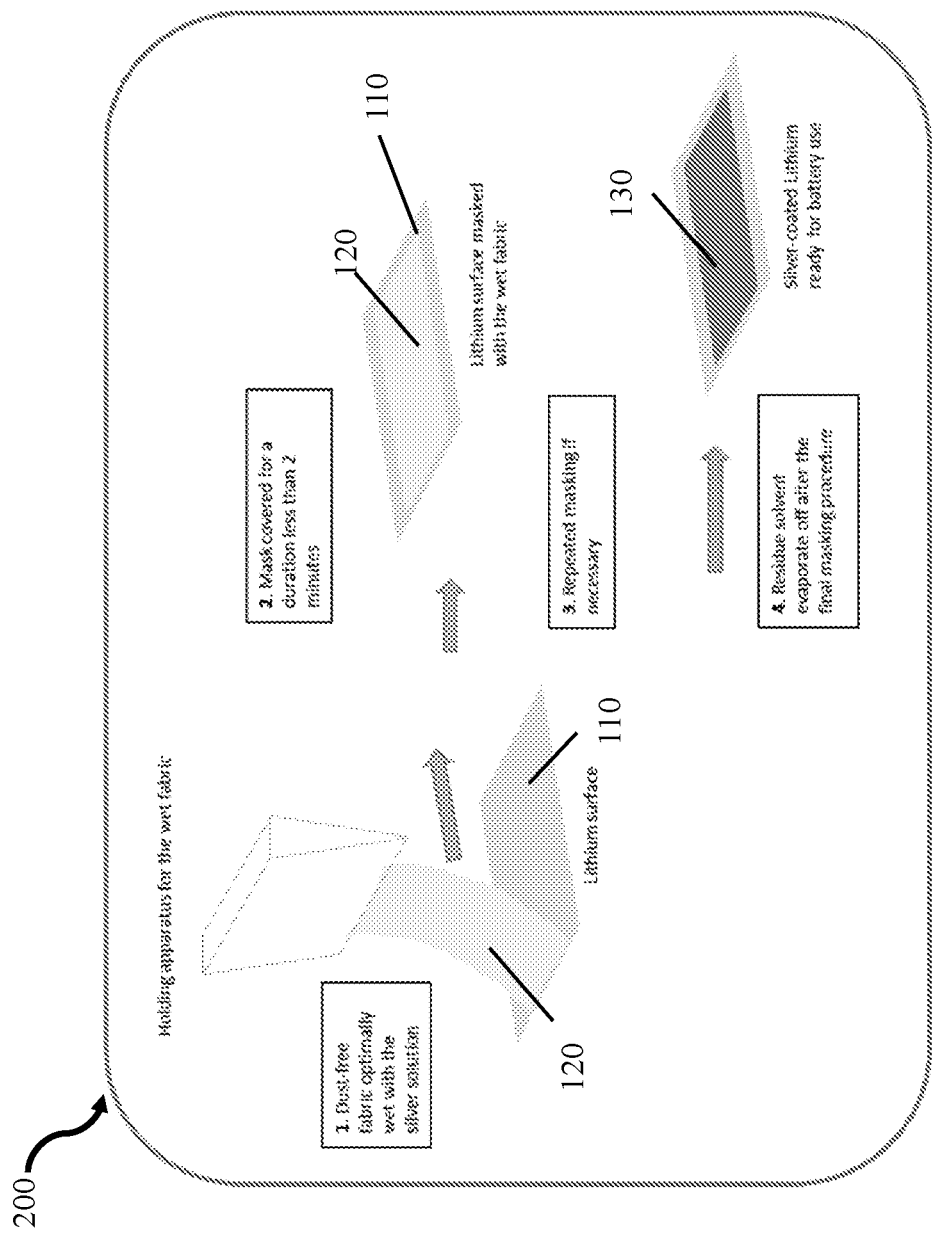
FIG. 2 is a masking process schematic for the dendrite-suppressing coating procedure.

FIG. 2 shows the process 200 for making the dendrite-suppressing coating for the anode of FIG. 1A. The lithium metal battery anode material is a lithium metal foil or a laminated lithium-copper foil and having a coating area greater than approximately 30 cm². Alternatively, the coating area may be greater than approximately 40 cm² or greater than approximately 50 cm². It is desired to form the dendrite-suppressing coating to be uniformly coated across the entire surface to a thickness of approximately 20 μm or less. The uniformity of the coating is plus or minus 20 percent of the design thickness. In another aspect, the uniformity of the coating may be plus or minus 10 percent of the design thickness. The method 200 for preparing a thin layer of a dendrite-suppressing metal coating on a lithium metal battery anode ensuring uniformity of large surface lithium coating including the following procedure.

First, provide an impregnated displacement reaction masking layer 120, the impregnated displacement reaction masking layer 120 including a solution having one or more metal salts and a solvent. In one embodiment, the metal is selected to be silver, but other conductive metals may also be used. In the present invention, a silver ion solution is developed based on solvents that do not react with lithium. The silver salt may be selected from one or more of silver nitrate, silver acetate, silver lactate, silver p-toluene sulfonate, silver heptafluorobutyrate, silver pentafluoropropionate, silver methanesulfonate, silver tetrafluoroborate, silver trifluoroacetate, silver bromide, silver hexafluorophosphate, silver iodide, silver bis(trifluoromethanesulfonyl)imide. As for the solvent, it may be one or more of dimethoxyethane, dioxolane, N-methylpyrrolidone, dimethylcarbonate, dimethylacetamide, tetrahydrofuran, triethyl phosphate, trimethyl phosphate, or a combination thereof. In one embodiment, the solution has a silver ion concentration of less than approximately 25 mM and the solution comprising dimethoxyethane/dioxolane/N-methylpyrrolidone in a ratio of 47.5/47.5/5.

A material 120 for contacting the lithium anode surface is impregnated with the metal salt solution. The material is selected from any absorbent woven or non-woven fabric that can hold the metal salt solution in intimate contact with the anode surface. In particular, dust-free fabrics are preferred for use. The fabric is saturated with the metal salt solution and any excess solution is removed to create an optimally wet fabric.

The lithium metal battery anode material 110 is contacted with the impregnated metal salt fabric masking layer 120. The duration of each contact with the impregnated displacement reaction masking layer is less than approximately 2 minutes. During this contact period, a displacement reaction occurs between the one or more silver salts and the surface of the lithium metal battery anode material such that silver salt is reduced to metallic silver 130 on the surface of lithium metal battery anode material, the metallic silver displacing a stoichiometric amount of lithium from the surface of lithium metal battery anode material.

By carrying out the masking procedure multiple times, but each time only for a short duration, the lithium surface is repeatedly exposed to a fresh solution during each masking step. By using fresh solutions each time, a constant silver concentration is exposed to the lithium surface, to maintain a constant driving force for the displacement reaction between lithium and silver ions throughout the coating surface. The purpose for carrying out each masking step for only a short duration, such as 2 minutes or less, or, optionally, 1 minute or less, is to ensure that (a) local concentration gradients on the solution slide over a large surface and (b) local over-growth of silver do not develop over each masking cycle. Combining these strategies therefore allow the uniform coating of thin layer silver on lithium foils for practical battery use, without sacrificing too much lithium. In practical battery terms, this means the coating can result in a stable battery performance without over-compromising the energy density, which is the primary purpose of using lithium metal. The examples below, a coating of uniform 20 micron thick silver layer over a large lithium surface is achieved from twice-masking a lithium surface with a low concentration silver solution. The high repeatability of this procedure was also demonstrated over several samples, showing the practicality of this coating technique for silver on large areas of lithium.

Exposure control ensures that the lithium layer does not become completely reacted, which happens if lithium is left to react with an excess amount of a silver solution. This exposure control is carried out through controlling 1) silver concentration in solution, 2) amount of solution transferred onto the lithium surface, and 3) controlling the time of reaction. These strategies are implemented together for achieving a practical coating of lithium with silver for lithium metal battery use.

Figure 3:
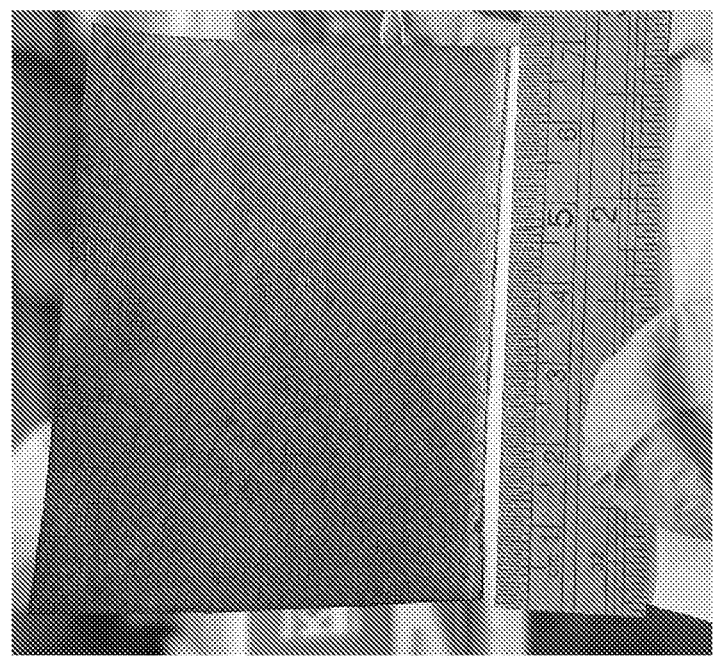
FIG. 3 is a 35 cm$^2$ sheet of silver coated lithium-copper foil.

After the reaction coating is finished and a desired silver thickness has been obtained, the unreacted solution is evaporated from the surface of the lithium metal battery anode material and a silver coated lithium foil 130 is obtained. In one embodiment, FIG. 3 shows the 35 cm² sheet of silver-coated lithium-copper foil, which displays the uniform silver deposition over a large area.

Figure 1B:
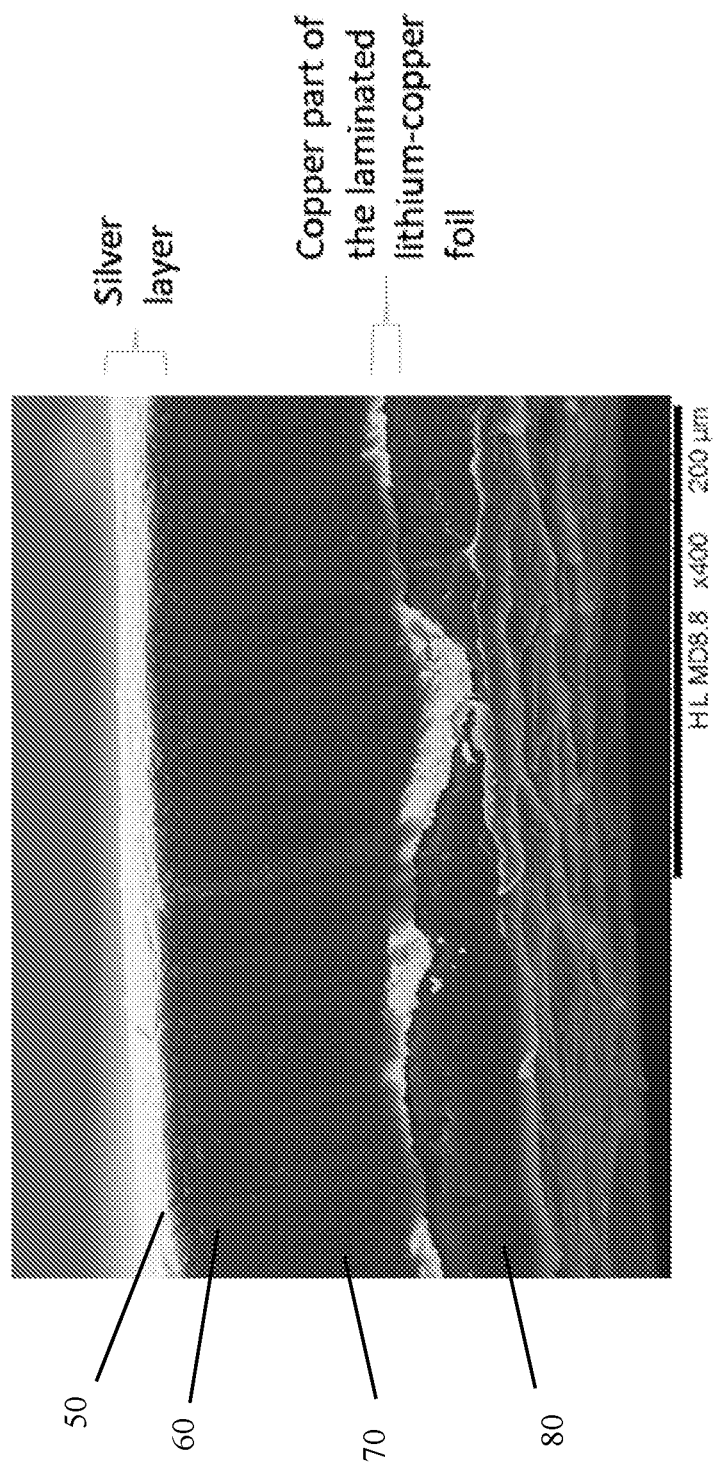
FIG. 1B is a cross-sectional scanning electron micrograph (SEM) of a silver-coated laminated lithium-copper foil.

FIG. 1B shows a cross-sectional scanning electron micrograph (SEM) of a silver (layer 50) coated laminated lithium- (layer 70) copper (layer 80) foil formed according to the above method and used as the anode 20 in the battery of FIG. 1A. The silver dendrite-suppressing coating 50 is approximately 20 microns. Since the dendrite-suppressing silver coating 50 is a displacement-reacted metal from decomposition of a silver salt (such as AgNO₃) an interface reaction product which is LiNO₃ is formed from a reaction between the silver salt and the lithium reactive metal layer (interface reaction product layer 60 which may be approximately 1 micron or less). The interface reaction product is positioned between the displacement-reacted metal layer 50 and the lithium reactive metal layer 70.

The following examples are presented to illustrate the present disclosure. They are not intended to be limiting in any manner.

Example 1

A silver ion solution was formed of silver nitrate at a concentration of approximately 20 mM in a mixture of dimethoxyethane/dioxolane/N-methylpyrrolidone in a ratio of 47.5/47.5/5. A lithium-copper foil having an area of approximately 30 cm² was used as the substrate. Two masking steps were performed, each lasting approximately 1 minute to form a silver layer of approximately 15-20 microns on lithium with a thin interlayer of lithium nitrate between the silver and the lithium layers. Using the coated material as the anode, a pouch lithium metal battery was created having a cathode composition of LCO and an electrolyte composition of solid electrolyte. The solid electrolyte includes 5 wt. % PPETA (poly propylene oxide-coethylene oxide tri acrylate) and 95 wt. % liquid electrolyte (1M LiPF$_6$ in EC/EMC/DEC/FEC/DME with volume ratio of 3:1:2:2:2).

Figure 4:
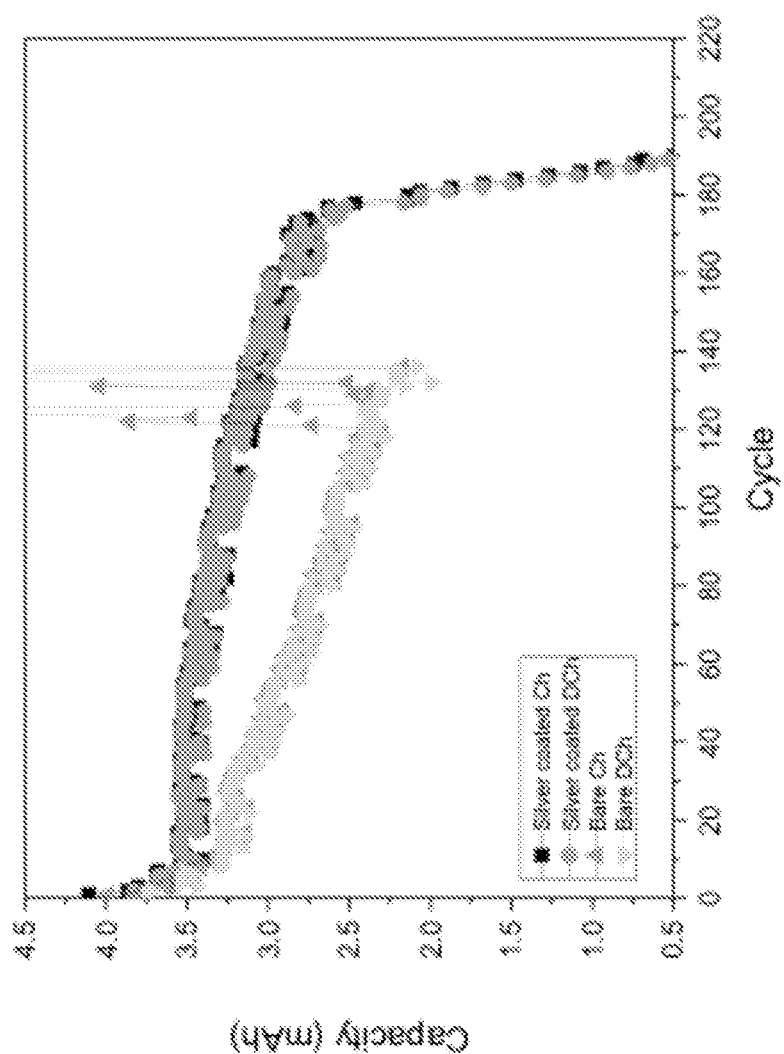
FIG. 4 is a comparison of battery performance using a silver coated lithium battery against a bare lithium battery in a coin cell test.

FIG. 4 shows the comparison of battery performance using a silver-coated lithium anode-containing battery formed as above against a bare lithium anode in a coin cell test. In this embodiment, the same cathodes, electrolyte composition and small electrolyte amount (20 μL) were used in both coin cell batteries. The bare lithium battery and the silver-coated lithium battery approximately show the same capacity before the first 10 cycles. However, after 10 cycles, the difference of the capacity of the bare lithium battery and the silver-coated lithium battery are increasing. The bare lithium battery suffers a lower capacity and shorted after 120 cycles. As for the silver-coated lithium anode-containing battery, it maintained a higher capacity after 120 cycles. Thus, when silver-coated lithium is used, the battery delivers a higher capacity throughout the cycling test and provides a longer cycling performance during which no short circuiting occurs.

Example 2

Figure 5:
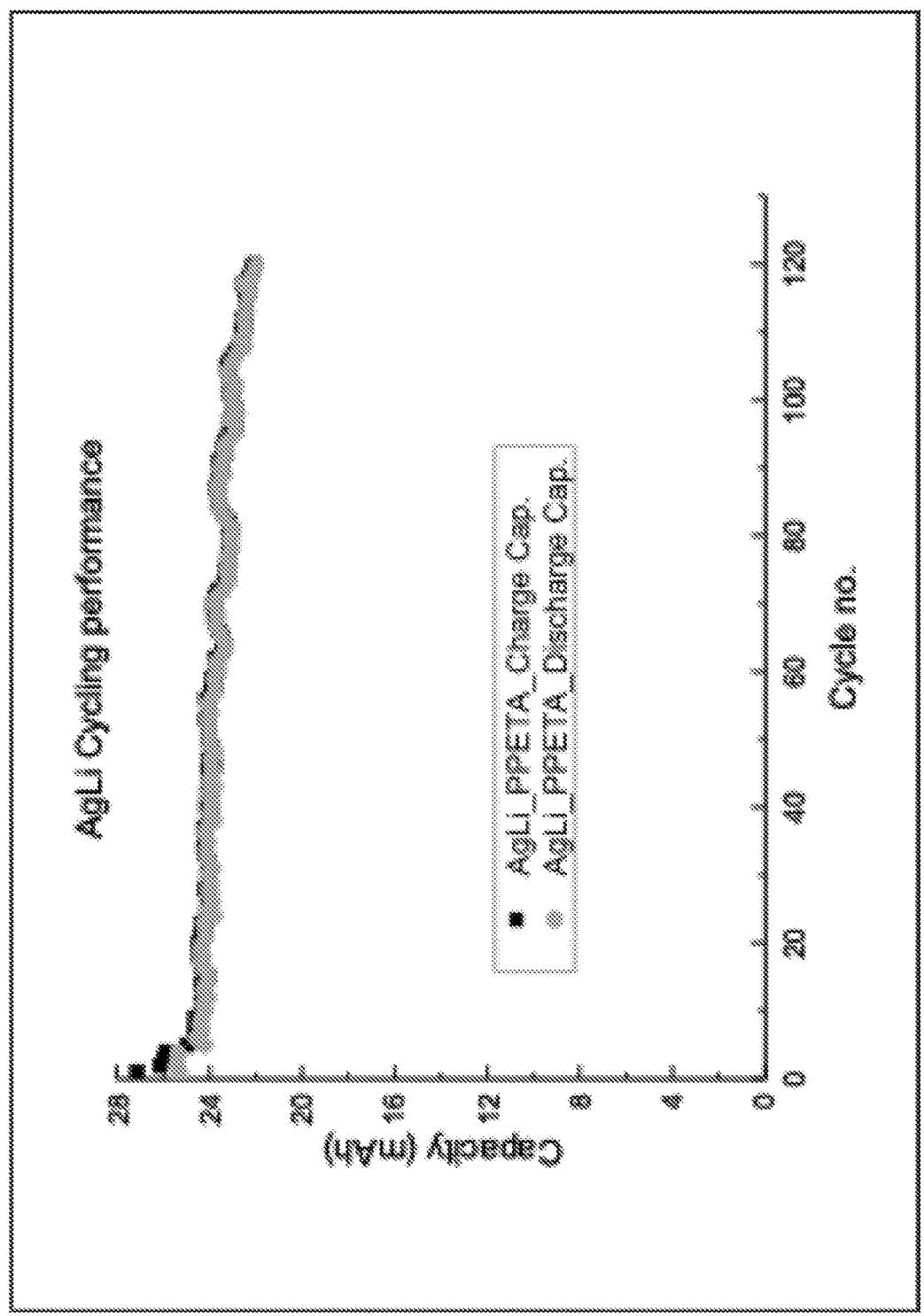
FIG. 5 is a cycling performance of silver coated lithium battery in a pouch cell.

FIG. 5 shows the cycling performance of a silver-coated lithium battery in a pouch cell. It demonstrates the silver-coated lithium battery performance after 120 cycles. The result showed the silver-coated lithium battery has good cycling performance in a pouch cell and the capacity is still above 20 mAh.

As opposed to drop coating or spray coating methods, using the masking technique of the present invention can uniformly coat a large-area surface. The uniform coating layer was obtained because the masking technique ensures uniform exposure of the entire lithium surface to the silver solution. As a result, no excess silver solution is carried by impregnated displacement reaction masking layer. The surface of lithium is not flooded with the silver solution, and the reaction of the lithium surface is therefore able to be controlled. With the masking technique disclosed in the present invention, a large area and uniform coating of lithium metal battery anode material is demonstrated. Thus, based on the present invention providing a method for preparing a thin layer of a dendrite-suppressing coating on a lithium metal battery anode material, a practical silver coated lithium foil for commercial-grade lithium metal batteries is demonstrated. The present invention has the ability to avoid dendrite growth, reducing of the battery's capacity, and an internal short circuit in the battery. It demonstrates better cycling performance than a bare metal lithium battery.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A lithium metal battery having a lithium metal electrode comprising:
   a cathode;
   an anode;
   a separator positioned between the cathode and the anode;
   an electrolyte solution;
   wherein the anode comprises:
     a lithium reactive metal layer on a support conductive layer; and
     a dendrite-suppressing coating above the lithium reactive metal layer with an interface reaction product positioned in between the dendrite-suppressing coating and the lithium reactive metal layer;
   wherein the dendrite-suppressing coating is a displacement-reacted metal silver, which was reacted from decomposition of a silver salt in a displacement reaction with the lithium reactive metal layer;
   wherein the interface reaction product is formed from the displacement reaction comprising lithium and the anion of the silver salt; and
   wherein the dendrite suppressing coating permits lithium metal ions to permeate the coating to react electrolytically in an overall battery reaction.

2. The lithium metal battery according to claim 1, wherein silver salt is AgNO$_3$ and the interface reaction product is LiNO$_3$.

3. The lithium metal battery according to claim 1, wherein the dendrite-suppressing coating is approximately 15-20 microns.

4. The lithium metal battery according to claim 1, wherein the support conductive layer comprises copper.

5. The lithium metal battery according to claim 1, wherein the electrolyte solution includes one or more lithium salts selected from the group consisting of LiAlCl$_4$, LiClO$_4$, LiPF$_6$, LiTFSI, and LiFSI.

6. The lithium metal battery according to claim 4, wherein the electrolyte solution further includes a solvent selected from the group consisting of one or more of propylene carbonate, ethylene carbonate, ethyl methyl carbonate, diethyl carbonate, dimethyl carbonate, fluoroethylene carbonate, dimethoxyethane, 1,1,2,2-tetrafluoroethyl 2,2,3,3-tetrafluoropropyl ether (TTE), and tris (2,2,2-trifluoroethyl) orthoformate (TFEO).

7. The lithium metal battery according to claim 1, wherein the cathode includes one or more of LiCoO$_2$, Li(Ni, Mn, Co)O$_2$, LiFePO$_4$, or Li(Ni, Co, Al)O$_2$.

8. A method for preparing a thin layer of a dendrite-suppressing coating on a lithium metal anode comprising:
   providing an impregnated displacement reaction masking layer, the impregnated displacement reaction masking layer including a solution having one or more silver salts and a solvent;
   contacting a surface of a lithium metal anode material with the impregnated displacement reaction masking layer;
   causing a displacement reaction between the one or more silver salts and the surface of the lithium metal anode material such that the silver salts are reduced to metallic silver on the surface of the lithium metal anode material, the metallic silver displacing a stoichiometric amount of lithium from the surface of the lithium metal anode material to create the dendrite-suppressing coating formed over the lithium metal anode material; and removing the impregnated displacement reaction masking layer from the surface of the lithium metal anode material;

wherein the dendrite-suppressing coating is approximately 15-20 microns.

9. The method of claim 8, wherein the lithium metal battery anode material is a lithium metal foil.

10. The method of claim 8, wherein the lithium metal anode comprises a copper foil laminated with lithium metal.

11. The method of claim 8, wherein the silver salt is one or more selected from the group consisting of silver nitrate, silver acetate, silver lactate, silver p-toluene sulfonate, silver heptafluorobutyrate, silver pentafluoropropionate, silver methanesulfonate, silver tetrafluoroborate, silver trifluoroacetate, silver bromide, silver hexafluorophosphate, silver iodide, and silver bis (trifluoromethanesulfonyl) imide.

12. The method of claim 8, wherein the solvent is one or more selected from the group consisting of dimethoxyethane, dioxolane, N-methylpyrrolidone, dimethylcarbonate, dimethylacetamide, tetrahydrofuran, triethyl phosphate, trimethyl phosphate, and combinations thereof.

13. The method of claim 12, wherein the solvent comprises dimethoxyethane/dioxolane/N-methylpyrrolidone in a ratio of 47.5/47.5/5.

14. The method of claim 8, wherein the method further comprises:

contacting the surface of the lithium metal anode material with the impregnated displacement reaction masking layer a plurality of times;

removing the impregnated displacement reaction masking layer in between contacting with the surface of the lithium metal anode material; and forming an interface reaction product between the lithium metal anode material and the dendrite-suppressing coating formed from the displacement reaction comprising lithium and anion of the silver salts.

* * * * *